United States Patent [19]
Markley

[11] 3,979,295
[45] Sept. 7, 1976

[54] FOLDED MEMBRANE DIALYZER WITH MECHANICALLY SEALED EDGES

[75] Inventor: Finley W. Markley, Burnsville, Minn.

[73] Assignee: The United States of America as represented by the United States Energy Research and Development Administration, Washington, D.C.

[22] Filed: Apr. 9, 1975

[21] Appl. No.: 566,497

[52] U.S. Cl. .............................. 210/321 B; 210/445; 210/493 M
[51] Int. Cl.² ......................................... B01D 31/00
[58] Field of Search ........... 210/321, 493, 445, 446; 23/258.5; 55/16, 158

[56] References Cited
UNITED STATES PATENTS

| | | | |
|---|---|---|---|
| 3,494,466 | 2/1970 | Rose et al. | 210/446 X |
| 3,780,870 | 12/1973 | Esmond | 210/493 X |
| 3,864,265 | 2/1975 | Markley | 210/321 |

Primary Examiner—Frank A. Spear, Jr.
Attorney, Agent, or Firm—Dean E. Carlson; Arthur A. Churm; Robert J. Fisher

[57] ABSTRACT

A semipermeable membrane is folded in accordion fashion to form a stack of pleats and the edges are sealed so as to isolate the opposite surfaces of the membrane. The stack is contained within a case that provides ports for flow of blood in contact with one surface of the membrane through channels formed by the pleats and also provides ports for flow of a dialysate through channels formed by the pleats in contact with the other surface of the membrane. The serpentine side edges of the membrane are sealed by a solidified plastic material, whereas effective mechanical means are provided to seal the end edges of the folded membrane. The mechanical means include a clamping strip which biases case sealing flanges into a sealed relationship with end portions of the membrane near the end edges, which portions extend from the stack and between the sealing flanges.

11 Claims, 9 Drawing Figures

FOLDED MEMBRANE DIALYZER WITH MECHANICALLY SEALED EDGES

CONTRACTUAL ORIGIN OF THE INVENTION

The invention described herein was made in the course of, or under, a contract with the United States Energy Research and Development Administration.

BACKGROUND OF THE INVENTION

This invention relates generally to methods and apparatus for flow of fluids through common wall conduits and more particularly concerns methods and apparatus for juxtaposed flow of fluids separated by a folded membrane. Still more particularly, the invention is directed toward an apparatus for use in the dialysis of two fluids and relates specifically to an apparatus for the cleansing of impurities from blood by hemodialysis.

Although experimental drug and diet treatments for persons having damaged or failed kidneys have recently been suggested, the many thousands of persons suffering from chronic kidney failure still require either artificial blood purification or the drastic procedure of kidney transplant. One method of artificial blood purification, hemodialysis, involves counterflow of juxtaposed blood and a dialysate, separated by a semipermeable membrane. Hemodialysis, at present, is most commonly performed in a hospital under supervision of trained personnel. Present systems require complex, expensive equipment and facilities and, at least in part because of the great expense, are not readily available or accessible. These systems are employed for periodic treatment of the patient. Thus, during periods between treatments, blood impurities increase in concentration and the resulting ill feeling builds up until the next treatment. Further, the treatment itself is time-consuming and painful, at least in part because of the necessity of connection and disconnection of the patient's blood supply to the external apparatus.

In attempts to overcome disadvantages, complexities and expense of prior hemodialysis treatment systems, various types of simplified portable and small-size dialysis systems have been suggested.

Among these efforts have been those described in my prior U.S. Pat. Nos. 3,522,885 and 3,565,258 as well as 3,778,369. These parallel-flow hemodialyzers are designed to operate without use of an external blood pump and to employ inexpensive, readily available materials so that the unit may be discarded after each use. A major drawback of the hemodialyzers of these prior patents resides in the use of relatively expensive, in the preferred thickness, flattened cellophane tubes stacked in a case for separating blood from the juxtaposed dialysate. The assemblies employing such tubes are expensive, complex and pose some difficulties in fabrication.

Among the dialyzers employing sheet membrane rather than tubes, are those described in U.S. Pat. Nos. 3,396,849 and 3,442,388. However, these require complex and costly support arrangements for the membrane as in U.S. Pat. No. 3,396,849, or a corrugated support member to hold a membrane that is made in a corrugated form, as in U.S. Pat. No. 3,442,388. Adhesive bonding of the membrane edges to a case is a significant problem in the latter arrangement, since materials used internally of the dialyzer that may be in contact with the blood must be chosen with regard to reaction with the blood.

The present invention is an improvement on the invention disclosed in my patent application for a Folded Membrane Dialyzer, Ser. No. 233,528, which has now issued as U.S. Pat. No. 3,788,482, and is also an improvement on my patent application for Edge Sealed Folded Membrane, Ser. No. 373,160, filed June 25, 1973, which issued Feb. 4, 1975 as U.S. Pat. No. 3,864,265. The disclosures of both of these applications are incorporated herein by this reference as though fully set forth.

In U.S. Pat. No. 3,788,482, I have disclosed a dialyzer designed to be used frequently for short periods of time and which may be discarded after use. The design eliminates the need for a blood pump and also avoids the requirement of complex associated equipment and safety circuits. In particular, this apparatus is adapted for use under a program of daily dialysis at home so as to provide a more nearly continuous removal of poisons from the blood and thus avoid the increased buildup of blood contaminates that occurs with less frequent treatment.

However, the folded membrane dialyzer of this patent requires a multi-element or form-in-place case that has proven relatively expensive to fabricate. In this apparatus, end edges and side edges of the folded membrane are sealed by embedding them in a plastic material that forms a portion of the housing. Access ports for blood and dialysate are formed by removal of studs that are positioned during curing or solidification of the sealing plastic. The end edges of the folded membrane are positioned between support strips and encapsulated as a subassembly step before the stack is mounted to the remaining portions of the case. Alternatively, the case and edge encapsulation are formed in place about the folded membrane stack.

In my later application Ser. No. 373,160, improved edge sealing is achieved by use of an end fold plate, permitting encapsulation of end edges but blocking flow of liquid encapsulating material into the flow ports. The arrangement of the prior application Ser. No. 373,160 is effective and efficient, and has proven to be satisfactory. Yet, because of the nature of the use of the apparatus for hemodialysis, and particularly because of its use as a disposable instrument, it is of critical significance to achieve improved ease and cost of fabrication and increased reliability. In the prior application Ser. No. 373,160, sealing of the end edge, like the sealing of the serpentine side edge, is achieved by a solidified liquid encapsulating material. The arrangement requires flow of such material over relatively long distances, between the several injection channels that are spaced along the length of the apparatus. This requires relatively high pressure of the injected liquid encapsulating material which may act to compress the membrane stack during the injection. If the encapsulating material solidifies before the compression of the stack is relieved to allow the stack to return to its desired configuration, the flow channels may be degraded. On the other hand, if the stack is allowed to return to a substantially uncompressed condition, the still-liquid encapsulating material is forced back out through the injection channels and must be removed from the exterior surface of the apparatus. Furthermore, in some cases it may be desirable in the apparatus described in my copending application Ser. No. 373,160 to achieve liquid encapsulation of the side edges as a first step, and allow curing time before accomplishing encapsulation of the end edges or vice versa. In either case, additional time for the two-step curing is undesirable from the standpoint of economy of manufacture.

Accordingly, it is an object of the present invention to provide improved edge sealing for the folded membrane of a fluid flow transfer apparatus.

SUMMARY OF THE INVENTION

In accordance with the present invention, a fluid flow transfer apparatus is provided in which a case encloses a semipermeable membrane sheet which is folded into a stack of very closely spaced pleats. The edges of the membrane are sealed so as to sealingly separate one surface of the membrane from the opposite surface. The serpentine side edges of the membrane are surrounded and embedded in a solidified plastic material whereas the end edges are sealed by mechanical clamping means which are engaged in a sealed relation with the opposite surfaces of the membrane near each of the end edges. Means are provided for passing a first fluid through the pleats in contact with one membrane surface and a second fluid through the pleats in contact with the opposite surface.

BRIEF DESCRIPTION OF THE DRAWINGS

A better understanding of the features of the present invention and the inherent advantages as well as a fuller appreciation of the invention will be obtained from reading the following description of the invention with reference to the drawings in which:

FIG. 3 is an enlarged view of a cross section of the apparatus of FIG. 1;

DESCRIPTION OF THE INVENTION

Referring to FIGS. 1 through 5, a fluid flow transfer apparatus, referred to herein for sake of convenience as a dialyzer, embodying principles of the present invention includes a case 10 having first and second case sides 11, 12, a top 13, a bottom 14 and first and second case ends 15, 16. Although the terms "top" and "bottom" are employed to designate specified portions of the case, the portions are so designated solely to facilitate the description of the invention and it should be understood that these terms do not imply or identify any preferred or required orientation of the dialyzer in use. It will be readily understood that the described apparatus may be used with any one of the sides, top or bottom in upper position or with either of the ends in upper position.

The case is conveniently made of two substantially identical injection-molded sections each having a continuous peripheral flange 17, 18 forming case sealing, clamping or pressure surfaces as will be more particularly described below. Integrally formed in the case sections are flow ports 19, 20, 21, and 22, each preferably having a diminishing cross section as the ports approach the case bottom 14, as is illustrated in the drawings, and respectively having flow connecting fittings 23, 24, 25, and 26 extending above the casing top 13 and joined to the ports at the points thereof of maximum cross section. When the case is formed by injection molding, the fittings may be formed integrally with the ports.

Figure 5:
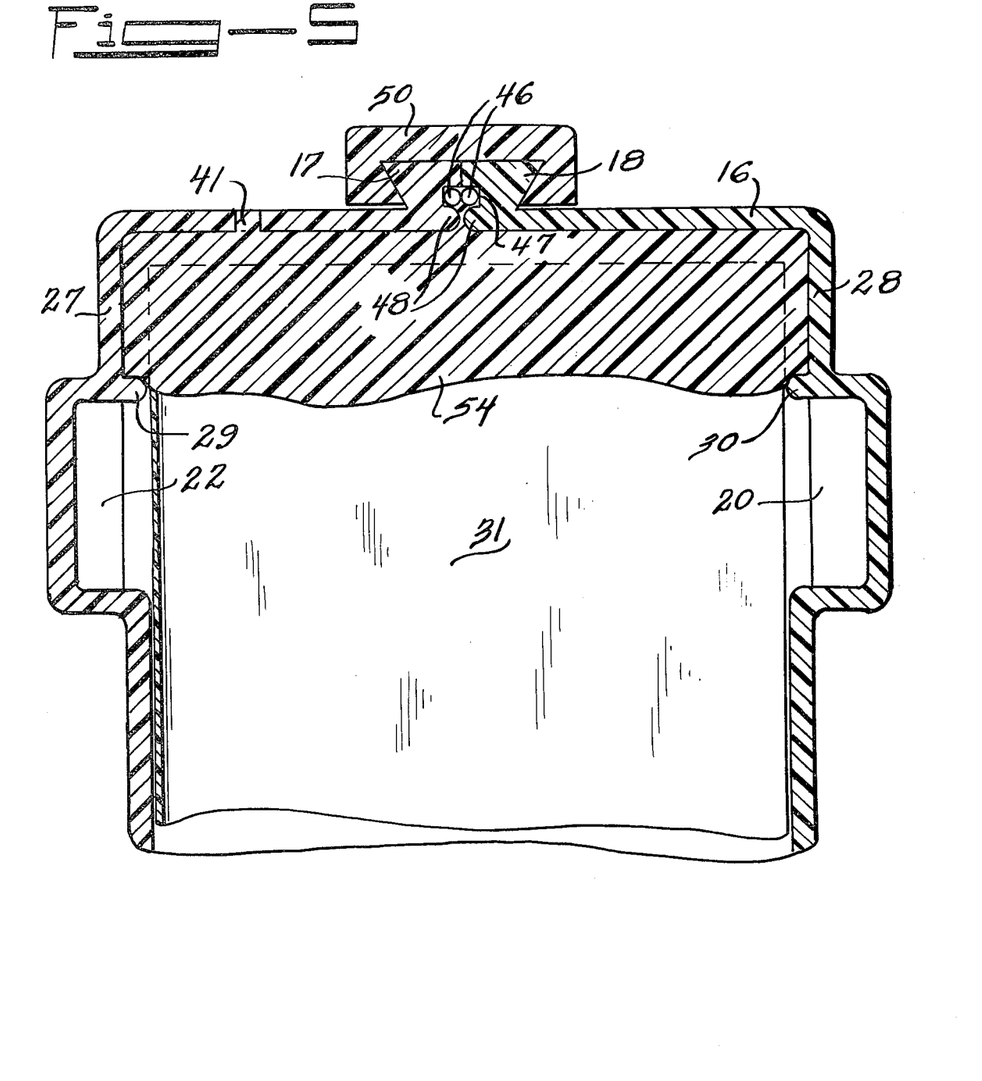
FIG. 5 is a longitudinal section taken along the line 5—5 in FIG. 3.

In a preferred embodiment of the present invention, both case sides can be formed with interior enlargements such as 27, 28 (FIGS. 2 and 5) at points adjacent to the case ends, these enlargements being clearly discernible in FIG. 5. The enlargements 27, 28 include interior rebated side portions such as 29 and 30 (rebated relative to enlargements 27, 28) formed between the enlarged side portions 27, 28 and the respective flow ports to facilitate surrounding and embedding of the membrane side edges with the plastic material, represented throughout as 54, as described in my copending application Ser. No. 373,160. The rebated portions 29 and 30 prevent the plastic material 54 from blocking the flow ports.

Figures 1, 4:
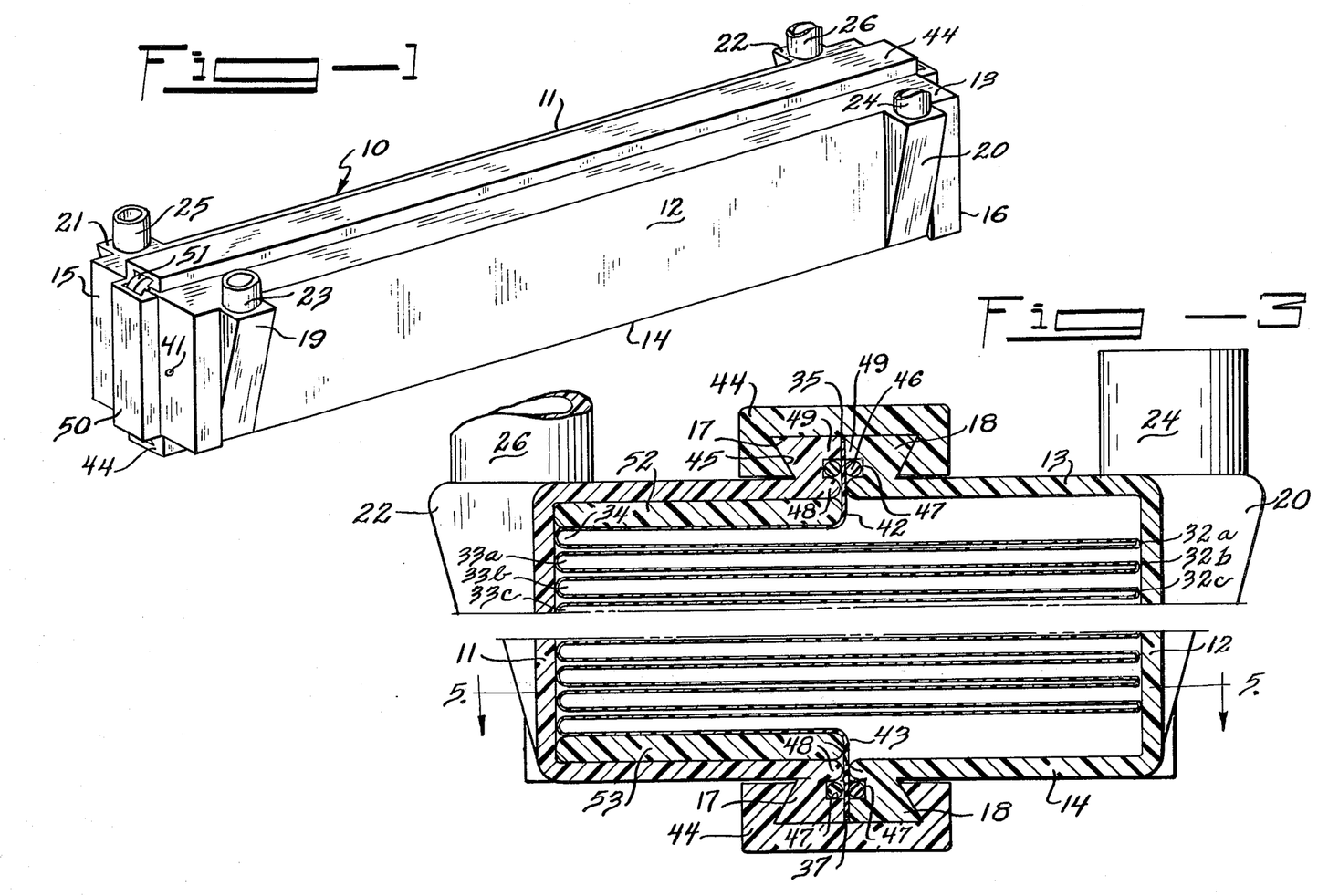
FIG. 1 is a perspective view of a fluid flow transfer apparatus embodying principles of the present invention.
FIG. 4 is an enlarged cross-sectional view similar to FIG. 3 taken near the end of the case beyond the flow ports and also showing an alternative single-gasket seal.

Encompassed within the case 10 is an edge sealed semipermeable membrane folded in accordion fashion so as to form a stack indicated generally at 31 (FIG. 2) of very closely spaced pleats that provide a number of fluid flow channels. The arrangement is such that all flow channels in contact with one surface of the membrane are in communication with each other at the pair of ports formed in one side of the case. The two sets of channels formed by the opposite surfaces of the membrane are sealed from and isolated each from the other. The stack is formed of a single sheet of a semipermeable membrane that is initially (before folding) in an exemplary rectangular configuration, having end edges, side edges, and opposite surfaces. The membrane is preferably formed of cellophane having a thickness of 0.0006 inch, a widely available, inexpensive and effective dialysis material. Nevertheless, other semi-permeable membranes known in the art may be employed without departing from the principles of this invention. Referring momentarily to FIG. 3, it can be seen that the membrane is folded into the stack of pleats, providing a plurality of pleats such as 32a, 32b, and 32c, which provide fluid flow channels for a fluid in contact with one surface of the membrane and pleats such as 33a, 33b, and 33c which provide channels for a fluid in contact with the opposite membrane surface. Referring again to FIG. 2, the stack includes a first or top end pleat 34 that terminates in a first end edge 35 of the membrane, and a second or bottom end pleat 36 terminating in a second end edge 37 of the membrane. The membrane is folded so as to reverse its direction at the pleat edges such as 38a, 38b, on one side of the stack, and pleat edges 39a, 39b, etc., on the other side, which collectively form sides of the stack as seen in FIG. 4. Ends of the stack, adjacent respective ends of the case, are defined by the serpentine side edges of the folded membrane such as the serpentine edge indicated at 40 in FIG. 2.

In the exemplary arrangement illustrated in the drawings, each end pleat 34, 36 extends in the same direction, from the left side of the stack as viewed in FIG. 3 to an intermediate portion of the stack. The stack includes pleats or channels that comprise first and second groups of channels for the juxtaposed flow of the two fluids.

As described in further detail in my U.S. Pat. No. 3,788,482, the arrangement is such as to provide a plurality of contaminated fluid (blood) channels and a plurality of contaminate absorbing fluid (dialysate) channels. The two groups of channels are confined to mutually opposite surfaces of the membrane. Within each of the dialysate channels or contaminate absorbing fluid channels is a liquid flow enabling spacer or support member, preferably formed of a plastic, nonwoven mesh that will maintain a suitable spacing between adjacent folds and yet provide a minimum impediment to flow of dialysate through the channel. Such nonwoven mesh is two layers of threads, each layer being in a different plane. For the sake of clarity and simplicity, these elements have not been illustrated in the drawings.

Preferably, no spacer members are inserted between adjacent folds forming the blood channels, and therefore, adjacent pleats are substantially in contact with each other until a pressurized liquid is caused to flow therethrough. In some cases, such as the dialysis of fluids other than blood, spacer members may be used in all pleats of both groups of channels, particularly if the higher pressure fluid does not act to open the higher pressure channels.

The ends of the case sections are formed with solidifiable plastic material injection ports, such as illustrated in FIG. 1 by small aperture 41 in case end 15, through which a suitable solidifiable liquid plastic material is injected. The injected material is fairly viscous and, accordingly, does not penetrate any significant distance from the ends into the channels between adjacent pleats of the folded membrane. The liqud plastic material solidifies in place at and about the serpentine side edges of the membrane such as edge 40 and, accordingly, provides a full and complete sealing of all of the side edges. Examples of suitable plastic material include polyethylene, polypropylene, polycarbonate, epoxy resins, polyester resins, polystyrene and the like. Other materials and details of side edge sealing are further described in U.S. Pat. No. 3,788,482.

Figure 2:
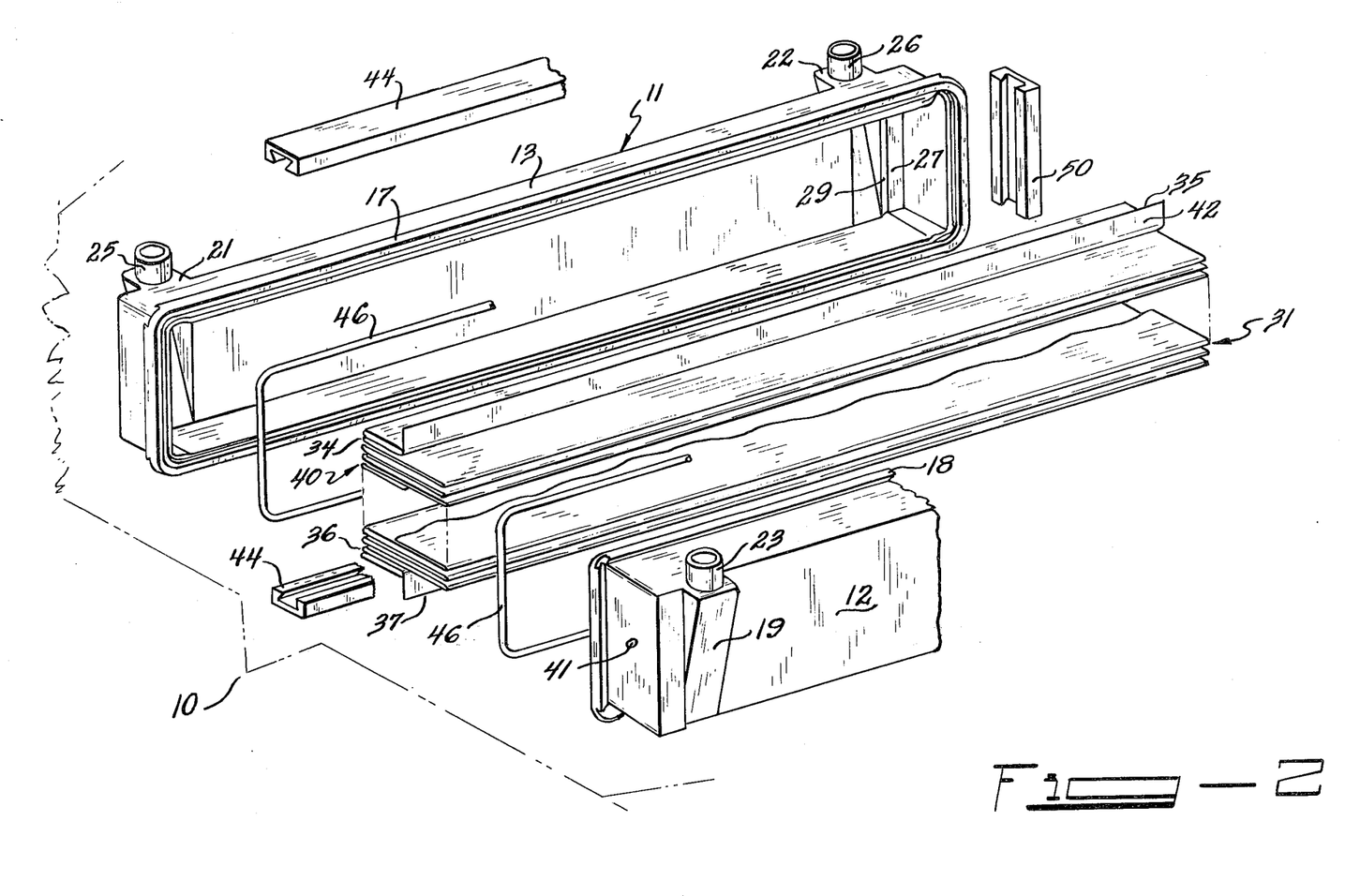
FIG. 2 is an exploded view of FIG. 1 with portions broken away.
Figure 4:
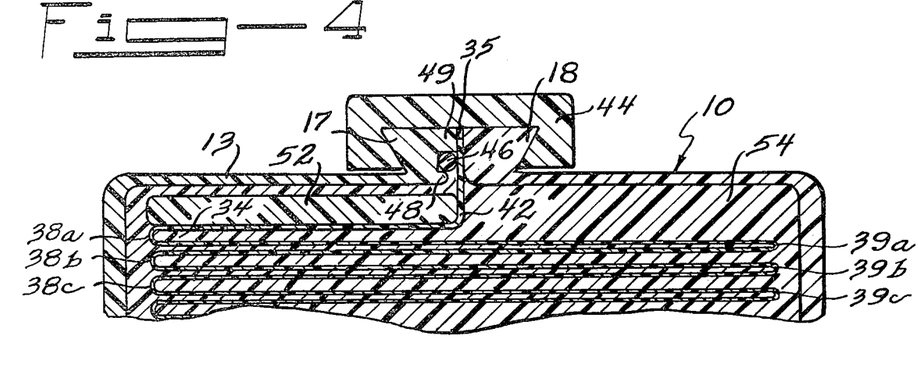

In accordance with a significant feature of the present invention, difficulties and problems involved with sealing of the end edges 35 and 37 of the folded membrane by means of a solidifiable liquid plastic material are substantially avoided, and improved sealing and efficiency of assembly and manufacture are obtained, by employing a mechanical sealing arrangement for the end edges 35 and 37 of the folded membrane. To this end, clamping means are provided for engaging the opposite surfaces of the membrane near each of the end edges to effect a sealed relationship. As is shown in FIGS. 2, 3, and 4, the semipermeable membrane includes a first and a second end portion 42, 43 near the respective end edges 35, 37, which end portions 42, 43 can be considered extensions of the first and second end pleats 34 and 36, respectively, and which extend in a direction away from the membrane stack 31. The end portions 42 and 43 extend so as to lie between case sealing clamping surfaces formed by the pair of mutually opposed continuous peripheral case sealing flanges 17 and 18. The case sealing flanges 17 and 18 are drawn toward each other, capturing the end portions 42 and 43 therebetween and engaging the opposite surfaces of the membrane in a sealed relation to effectively seal the end edges 35 and 37.

In one particular embodiment of the invention, the outermost sides of the flanges 17 and 18 are inclined upwardly and outwardly with respect to the case (as viewed in FIG. 3) to receive a clamping strip 44 having an inverted wedge-shaped groove 45 that mates with and closely fits the inclined outer surfaces of the flanges. Clamping strip 44 is a tight and snug sliding fit over the flanges 17 and 18 to thereby provide inwardly directed pressure on both of the flanges, urging these toward each other in sealing relation against the interposed end portion of the membrane, end portion 42 as shown in FIGS. 3 and 4.

In a further embodiment of the invention, the sealed relationship between the membrane and the case sealing flanges can be effected by interposing a gasket between at least one of the case sealing flanges and the membrane. For sake of illustration of possible alternatives, FIG. 3 is shown with two gaskets employed, whereas in FIG. 4 only one such gasket is used. Referring to these two figures, a sealed relation is effected between the membrane at end portion 42 and the case sealing flanges 17 and 18 by a gasket or gaskets 46. The gaskets 46 can be seated in respective continuous grooves 47 formed in the flanges 17, 18 and defined between inner lips 48 of the flanges and outer lips 49. The case sealing flanges are urged toward each other to thereby compress the gaskets 46 in sealing relation against the interposed end portion of the membrane 42.

The gaskets are made of a resilient material such as a medical grade of silicone rubber, a soft polyvinyl chloride, or any one of a number of different types of rubbers, provided, however, that the material of the gasket must be medically compatible with blood where the apparatus is used for hemodialysis.

It is preferred that the edges of the inner lips 48 of the case sealing flanges be rounded as illustrated in the drawings to avoid undue stress on the membrane. For the major portion of the length of the case, the inner lips 48 are spaced from each other by only a slight distance, as is shown in FIG. 3, in order to allow the membrane to pass freely between the inner lips but close enough to prevent any significant degree of motion which may be caused by flow of liquid through the several channels.

The outer lips 49 of the case sealing flanges 17 and 18 are pressed tightly against each other and against the end portion 42 of the membrane interposed between these lips, since damage to the membrane at this point, beyond the seal provided by the compressed gasket 46 is of little consequence.

In order to facilitate sealing of the side edges of the membrane and ensure a proper joint and proper contact between the two different types of sealing arrangement, namely, the gaskets at the end edges and the plastic material at the side edges, the case sealing flanges 17 and 18 have the inner lips 48 thereof set back a slight amount at portions of the flanges near the ends of the case as shown in FIG. 4.

The case top and bottom can be enlarged internally at the case ends, as indicated by the decreased thickness of case top 13 in FIG. 4 (compare with the thickness of the case top 13 in FIG. 3) to ensure flow of plastic material 54 over the gaskets 46 (at the case ends) to the mechanical end edge seal.

It will be readily appreciated that, in the embodiment of FIGS. 1 through 5, as well as in other embodiments described below, the gaskets may be formed, with or without use of gasket grooves, by depositing upon the opposing pressure faces of the flanges 17 and 18 a resilient strip or ridge of readily deformable sealing material.

An end clamping strip 50 is shown for portions of the case sealing flanges that extend across the case ends. (FIGS. 1, 2, and 5.) However, these end strips may be omitted because the flanges have sufficient rigidity so that the clamping achieved by the strips 44 at the top and bottom of the case will keep the flanges across the ends sufficiently close to each other to retain the plastic material while it is liquid. Sealing of the membrane side edges, at the case ends, is provided by the solid plastic material and, accordingly, no mechanical seal is required at the case ends. The case sealing flanges can be continuous, about the entire periphery of the case, except for outer portions at the flange corners 51, which are cut away or formed so as to permit the clamping strip to be applied.

In a preferred embodiment, stack handling end plates 52 and 53 are interposed between the top and bottom of the case and the end pleats 34 and 36 and are preferably positioned upon the outer surface of outermost folds of the stack. These extend nearly the full length of the case (but short of the membrane side edges) and have a width sufficient to extend between the side of the stack and the angulated outwardly extending end portions 42 and 43 of the membrane.

With the edges sealed and the stack mounted within the case, one of the two fluids employed in the dialysis is introduced into a first port 19 and flows along the side of the stack for the length of the port into all of the channels that are formed by a first surface of the membrane. This flow continues between and along each of the channels to the end of the channels, thence out through the flow port 20. Similarly, and concomitantly, a counterflowing second fluid is introduced into port 22 and distributed to all the second fluid channels, that is, all of the channels formed by the opposite surface of the folded membrane. These channels, like the first channels, extend across the full width of the stack between the case sides 11 and 12. The second fluid flows through the membrane channels for substantially the length of the case to port 21 from which it is collected for regeneration or disposal. Preferably, when the apparatus is used for hemodialysis the blood is introduced into the blood inlet port with or without pumping at approximately arterial pressure or higher and thus separates the closely adjacent sides of the blood channels. Dialysate is introduced into the dialysate inlet port at a slightly lower pressure. The unwanted accumulations which are in higher concentration in the blood pass through the membrane to the dialysate which has a lower concentration of such contaminates. Water also passes through the membrane because of the pressure difference across the membrane.

Figure 6:
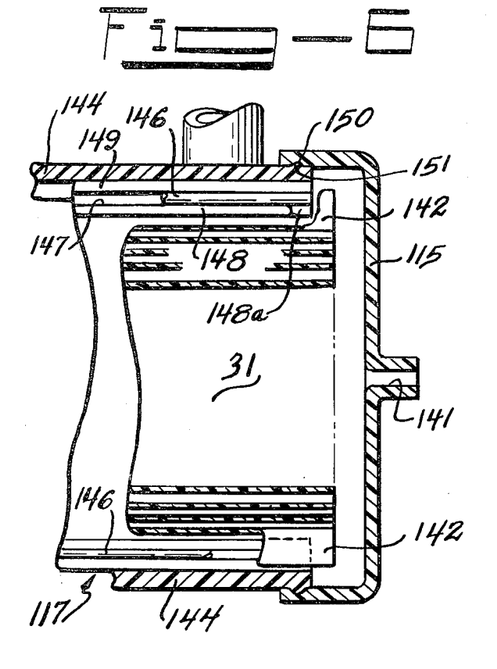
FIG. 6 is a view of an alternative embodiment of the invention employing end caps for the case.

In a modified form of the invention shown in FIG. 6, the case sealing flanges 117 are clamped by a clamping strip 144 which terminates at the ends of the case at both top and bottom, and the case sections are formed without any end closures. Ends of the case are closed by the use of end caps 115, an end cap 115 being shown in FIG. 7, that are provided as a tight, snap fit over the mating case sections and over the ends of the case sealing flanges, being held in place by interaction of projections 150 received in mating grooves 151 formed in resilient sides of the end caps. The end caps are formed with solidifiable liquid plastic material injection apertures 141 corresponding to the injection aperture 41 of the embodiment of FIGS. 1 through 5.

In this embodiment the gaskets are not continuous but are coextensive with the gasket grooves 147 defined by case sealing flange inner lip 148 and outer lip 149. The case sealing flange inner lip 148 is set back at the groove ends, as indicated at 148a, to effect an improved joint between the side edge seal and the mechanical sealing, as was discussed previously for the embodiment shown in FIG. 4.

The solidifiable liquid plastic material is injected through the end caps 115 (FIG. 6) or through the corresponding apertures in the ends of the case in the embodiment of FIGS. 1 through 5, and readily flows around and over the side edges of the stack of folds. Such flow is facilitated by the interior enlargments of sides of the case, as previously described in connection with the embodiment of FIGS. 1 through 5. The setback of the inner lips of the gasket groove allows the liquid encapsulating material to flow over the side edges of the membrane at the end portion of the end fold to ensure a proper sealing joint between the plastic material and the end portions of the end edge sealing gaskets.

Figures 8, 9:
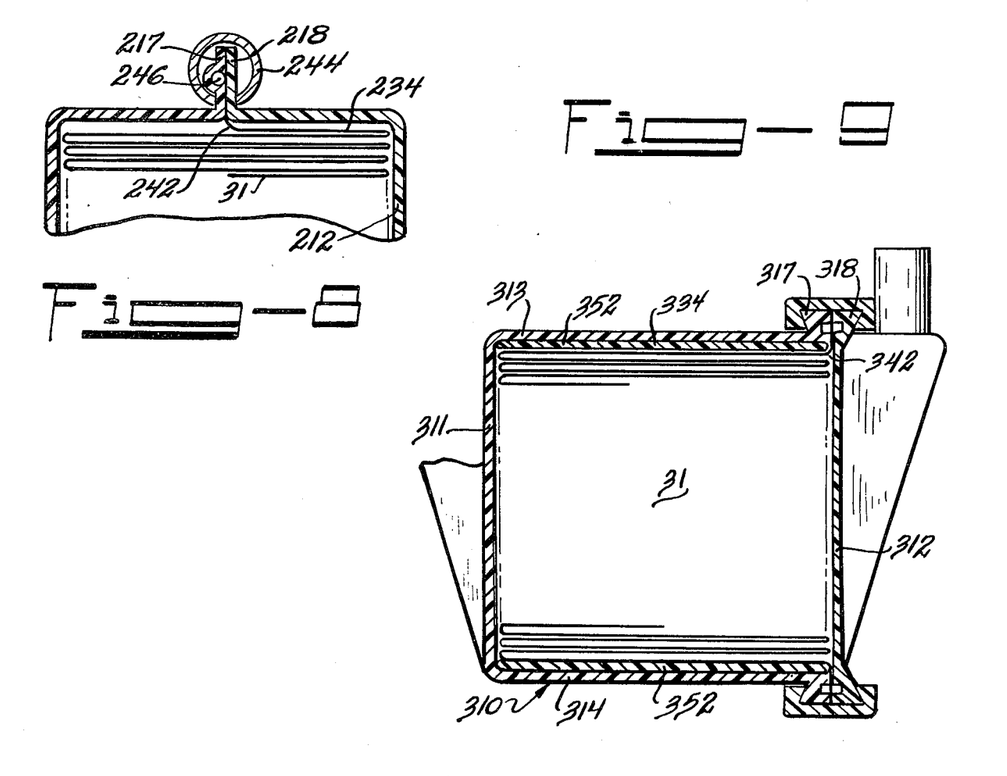
FIG. 8 shows an embodiment having a deformed case flange and gasket for mechanical sealing.
FIG. 9 is a view of another embodiment of the invention employing asymmetrical case sections joined at one side of the case.

Illustrated in FIG. 8 is an alternate arrangement of mechanical edge sealing wherein the case sealing flanges 217, 218 of case sections 211 and 212 are pressed toward each other by a clamping strip in the form of a deformable crimp ring 244 to firmly and securely clamp the end portion 242 of the membrane end pleat 234 between the case sealing flanges. Preferably, at least one of the flanges such as 217 is formed with a gasket groove having a gasket 246 captured therein and pressed against the surface of the interposed end membrane end portion 242. The arrangement of FIG. 8 may be made either by vacuum forming or by molding. If deemed necessary or desirable, the case sealing flange 218 may also be provided with a gasket groove and a gasket, whereby a pair of opposed gaskets will be pressed against opposite surfaces of the end portion 242 of the membrane. Similarly, in the other embodiments described herein, only one of the cooperating case sealing flanges need be provided with the gasket and gasket groove for effecting the mechanical end edge sealing of the folded membrane.

A stack handling end plate of substantially full width may be employed, as illustrated in FIG. 9, where the two case sections are asymmetrical and the joint between sections is positioned substantially at one side of the stack. As shown in FIG. 9, a full width stack handling end plate 352 is positioned upon the outermost pleat 334 of the stack of membrane pleats formed previously described. The case includes a first section 310 having a top 313, a bottom 314, and a side 311, the top and bottom having a width equal to substantially the full width of the stack and terminating in case sealing flanges 317 that mate with case sealing flanges 318 of a second case section 312 that has a side but substantially no top and bottom sections. Blood and dialysate ports are formed in the two case sections as previously described. In the arrangement of FIG. 9, the end portion 342 of the end fold 334 is positioned substantially at one side of the stack so that the stack handling end plate 352 may extend the full width of the stack and no danger is presented to the folded membrane in sliding the stack into the case.

Another embodiment of the present invention provides another form of mechanical sealing of the membrane end edges. Again, the folded and serpentine side edges of the membrane are sealed by an injected solidifiable liquid plastic material in the manner previously described in connection with the embodiments of FIGS. 1 through 9. Like the previously described embodiments, the end edges are not sealed by an encapsulation material, but are mechanically sealed by the case sealing flanges between which the end portions of the end pleats are pressed. Thus, the end pleat has an end portion that extends between case sealing flanges, but in this embodiment, the end edge terminates short of the outermost bounds of the case sealing flanges. In assembly, the surfaces of the case sealing flanges are covered with a solvent so that when pressed together, the softened surfaces of the flanges will bond to each other where they are in contact with each other and, moreover, will closely conform to the surface of the interposed membrane end portion. The solvent bonding of the case sealing flanges to each other may be augmented or replaced by conventional sonic welding to provide a sonic welded ridge.

To enhance the bond and sealing of the flanges, the end portion of the membrane can be formed with a plurality of apertures that are spaced longitudinally of each other along the length of the case. The apertures allow sonic bonding of the case sealing flanges inwardly of the outer bounds of these flanges and thus considerably strengthen the bond. This prevents the peel-back or tearing of the bond as may occur under the pressure of the fluid flowing through the apparatus during operation.

To ensure pressing of the two flanges against each other and against the interposed membrane end portion, a clamping strip is provided as a tight fit over the flanges and bonded thereto if deemed necessary or desirable.

In manufacture of the several embodiments described herein, the several case parts are formed, preferably by injection molding, or by vacuum forming. The membrane is folded and the mesh spacers inserted between folds that form the dialysate channels. The stack handling end plates are positioned, preferably upon the outermost surface of the end pleats at both top and bottom of the stack. The assembly of folded membrane stack, spacers and end plates is inserted into the case sections, one section at a time, preferably after coating the inner sides of the case sections with a layer of adhesive, encapsulating material or other resilient sheet that will serve to fill the space between the sides of the stack and close the sides of the several channels between the input and output flow ports. Where gaskets are used for end edge sealing, these are placed before insertion of the stack into the case sections. Where solvent bonding is used, the solvent coating of the case sealing flanges is performed before insertion of the stack assembly into the case.

In the embodiment of FIGS. 1 through 5, the endmost portions of the end pleats of the membrane, which may project beyond the top and bottom of the mating flange pairs 17 and 18, are severed and the clamping strips 44 and 50 are slid over the flanges while the case sections are urged toward each other. If deemed necessary or desirable, the clamping strips may be secured in place by suitable means such as adhesive or other bonding techniques.

Where the clamping strips are in the form of the deformable crimping ring 244 illustrated in FIG. 8, this crimping ring is positioned and deformed by a suitable crimping tool to fixedly secure and press the flanges to each other in sealing relation with the interposed end portion of the membrane end fold.

Figure 7:
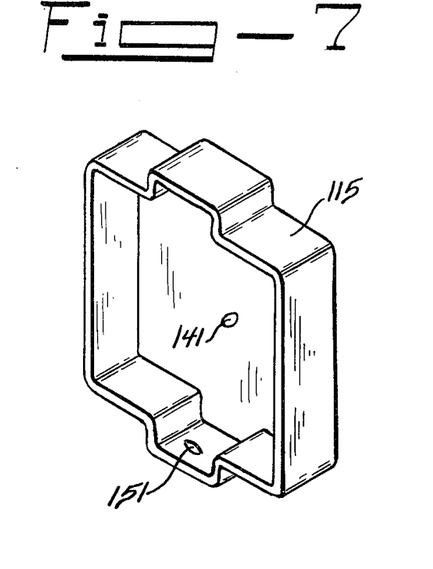
FIG. 7 is a perspective view of an end cap for the embodiment of FIG. 6.

For the embodiment employing end caps, as shown in FIGS. 6 and 7, a further step in the assembly is the placement of the end caps over the ends of the case, snapping these in place. This completes the mechanical portion of the assembly for all of the described embodiments. The end edges of the membrane have been firmly clamped and sealed during this assembly and no liquid injection (other than the coating of the case sides) has been necessary for the sealing of these end edges. Now the liquid plastic material is injected through the ends of the case, or through the end caps, and will flow over and around the side edges of the folded membrane as previously described, making a full and completely sealed junction with the mechanical edge seal provided by the gaskets or the case sealing flanges. Since the liquid plastic material need not flow for relatively long distances from the point of injection, high pressure of the injected plastic liquid is not required and the membrane stack is not subjected to high injection pressures. Plastic material injection time is significantly decreased since considerably less material is required. As no plastic material is employed for the end edges, no structure is required at the top and bottom of the case to block flow of such liquid material into the flow ports that are formed in the sides of the case. The inwardly rebated portions of the case sides prevent flow of the liquid encapsulating material from the case ends into the flow ports. In general, it will be seen that the assembly involves a simplified and shorter procedure and is more readily adapted to rapid automated operations. Accordingly, the resulting apparatus is of increased reliability and decreased cost, thereby making disposable hemodialyzers more readily and widely available.

Although the invention has been described in a form particularly adapted for use as a hemodialyzer, it will be readily appreciated that it may be employed for filtering other fluids or liquids, flowing other types of contaminated fluid through the "blood" channels and flowing other types of cleansing solution through the "dialysate" channels, or effecting different types of transfer between particular fluids. Of course, other encapsulation materials compatible with the particular membrane and case material may be chosen from those materials that exhibit proper flow characteristics and which may be conveniently solidified. Accordingly, the terms blood and dialysate as employed herein to identify liquids, channels and ports, are used merely for convenience of exposition and are to be construed as including other fluids. Also, other types of membranes or folded sheets may be employed as dictated by the particular fluids and by the nature of the desired transfer between the fluids.

The foregoing detailed description is to be clearly understood as given by way of illustration and example only, the spirit and scope of this invention being limited solely by the appended claims.

The embodiments of the invention in which an exclusive property or privilege is claimed are defined as follows:

1. A dialyzer comprising:

a case;

a semipermeable membrane sheet disposed within said case and folded into a stack of very closely spaced pleats, said folded membrane having end edges and serpentine side edges, and said membrane including near each end edge an end portion extending from said stack of pleats;

means for sealingly separating one surface of said membrane from the opposite surface, said sealing means comprising a solidified plastic material surrounding and embedding the side edges of said membrane and clamping means in the form of a pair of mutually opposed case sealing flanges formed on said case engaging the opposite surfaces of the membrane near each of the end edges in sealed relation thereto, and means for pressing said case sealing flanges toward each other with said end portion captured therebetween; and means for passing a first fluid through the pleats in contact with one surface of the membrane and a second fluid through the pleats in contact with the opposite surface.

2. The dialyzer of claim 1 wherein said clamping means further comprises a clamping strip secured to and about said case sealing flanges to urge the flanges toward each other with said end portion interposed therebetween.

3. The dialyzer of claim 2 wherein said case sealing flanges each includes an upwardly and outwardly inclined side, said flanges together collectively forming a wedge, and wherein said clamping strip has a conforming wedge-shaped groove, said case sealing flanges being received within said groove and compressed by said clamping strip.

4. The dialyzer of claim 1 including a gasket interposed between at least one of said case sealing flanges and said end portion.

5. The dialyzer of claim 4 including first and second end caps on opposite ends of said case, and wherein said solidified plastic material surrounds and embeds said side edges and extends between said end caps and the ends of said gasket.

6. The dialyzer of claim 1 wherein at least one of said case sealing flanges is formed with a gasket groove, and including a gasket positioned in said groove and compressed between said groove and said end portion.

7. The dialyzer of claim 6 wherein said case sealing flanges extend completely around the top, bottom and ends of said case and wherein said gasket groove extends continuously around said one sealing flange.

8. The dialyzer of claim 1 wherein each of said case sealing flanges is formed with a gasket groove, and including first and second gaskets in respective gasket grooves, said gaskets being pressed against opposite sides of said end portion.

9. The dialyzer of claim 1 wherein said case sealing flanges extend beyond the end edges of said membrane and are bonded to each other at points beyond said end edges.

10. The dialyzer of claim 1 further including a plurality of spacer members positioned within the pleats and in contact with one of the membrane surfaces only.

11. Fluid flow transfer apparatus comprising:

a semipermeable membrane having first and second surfaces, first and second end edges, first and second side edges, said membrane being folded to form a stack of pleats having a first end pleat terminating at said first end edge and having a second end pleat terminating at said second end edge, said membrane further being folded so as to have first and second end portions near said respective end edges, said end portions extending from said stack, said stack including a plurality of pleat edges collectively forming opposite sides of the stack, said folded membrane having serpentine side edges forming the ends of said stack;

a case encompassing said stack and including first and second case sides extending along respective sides of said stack adjacent said pleat edges, first and second case ends extending along the respective side edges of the folded membrane, a plurality of flow ports in said case sides in communication with said first and second membrane surfaces at said pleat edges;

a plurality of spacer members positioned between selected pleats of said stack in contact with one of said membrane surfaces only;

a solidified plastic material between the case ends and the stack ends whereby said solidified plastic material surrounds and embeds said serpentine side edges of the folded membrane;

a first and second case sealing flanges on said case, said membrane end portions extending between said sealing flanges; and a clamping strip engaging said sealing flanges and biasing said sealing flanges toward each other so as to effect a sealed engagement with the membrane end portions clamped therebetween.

* * * * *